US010625444B2

(12) United States Patent
Treffer et al.

(10) Patent No.: US 10,625,444 B2
(45) Date of Patent: Apr. 21, 2020

(54) VACUUM COMPRESSION MOLDING

(71) Applicant: MeltPrep GmbH, Graz (AT)

(72) Inventors: Daniel Treffer, St. Gertraud (AT); Johann Grubbauer, St. Ruprecht an der Raab (AT); Gerold Koscher, Graz (AT); Thomas Klein, Kindberg (AT); Johannes Khinast, Graz (AT)

(73) Assignee: MELTPREP GMBH, Graz (AT)

( * ) Notice: Subject to any disclaimer, the term of this patent is extended or adjusted under 35 U.S.C. 154(b) by 444 days.

(21) Appl. No.: 15/321,709

(22) PCT Filed: Jun. 26, 2015

(86) PCT No.: PCT/EP2015/064547
§ 371 (c)(1),
(2) Date: Dec. 22, 2016

(87) PCT Pub. No.: WO2015/197830
PCT Pub. Date: Dec. 30, 2015

(65) Prior Publication Data
US 2017/0157813 A1    Jun. 8, 2017

(30) Foreign Application Priority Data
Jun. 26, 2014 (GB) .................................. 1411400.3

(51) Int. Cl.
*B29C 43/14* (2006.01)
*B29C 43/36* (2006.01)
(Continued)

(52) U.S. Cl.
CPC .............. *B29C 43/14* (2013.01); *B29C 33/68* (2013.01); *B29C 43/027* (2013.01);
(Continued)

(58) Field of Classification Search
CPC ......... B29C 43/14; B29C 43/52; B29C 43/58; B29C 43/361; B29C 43/027; B29C 43/56;
(Continued)

(56) References Cited

U.S. PATENT DOCUMENTS 4,054,405 A    10/1977  Facey et al.
5,130,071 A *  7/1992   Iseler .................. B29C 43/3607
                                                    264/102
(Continued)

FOREIGN PATENT DOCUMENTS

DE    10-2010-034923 A1    2/2012
GB             767532      4/1955
(Continued)

OTHER PUBLICATIONS

Examination Report issued in parallel application GB1411400.3 dated Feb. 7, 2017, 4 pages.
(Continued)

*Primary Examiner* — Jeffrey M Wollschlager
(74) *Attorney, Agent, or Firm* — Lewis Roca Rothgerber Christie LLP

(57) ABSTRACT

There is provided an apparatus for molding a thermoplastic material into a homogenous sample body having a predetermined shape, the apparatus comprising: (a) a main body (110) comprising a first opening (112), a second opening and a hollow bore (116) connecting the first opening (112) with the second opening, the hollow bore (116) being adapted to receive a separation foil shaped to cover at least a part of the hollow bore surface; (b) a piston (120) adapted to fit moveably into the hollow bore (116) containing the separation foil; (c) a base plate (130) comprising a protrusion, wherein the base plate (130) is adapted to be inserted into the first opening (112) in such a manner that the protrusion extends into a part of the hollow bore (116) containing the
(Continued)

separation foil, and wherein the base plate (130) is adapted to transfer heat from a heating unit to a thermoplastic material (150) resting on the protrusion (132); (d) a vacuum connector (142) adapted to be connected to a vacuum source; (e) a lid (140) adapted to fit moveably into the second opening and adapted to apply a force to the piston (120) when the vacuum connector (142) is connected to the vacuum source such that the piston (120) applies a compressing force to the thermoplastic material (150) resting on the protrusion. There are further provided a method and a system for molding a thermoplastic material into a homogenous sample body having a predetermined shape.

17 Claims, 9 Drawing Sheets

(51) Int. Cl.
  B29C 33/68  (2006.01)
  B29C 43/56  (2006.01)
  B29C 43/02  (2006.01)
  B29C 43/52  (2006.01)
  B29C 43/58  (2006.01)
  B29L 31/40  (2006.01)
  B29K 105/00 (2006.01)
  B29C 43/32  (2006.01)
  B29K 101/12 (2006.01)
  B29L 31/00  (2006.01)
(52) U.S. Cl.
  CPC ............ *B29C 43/361* (2013.01); *B29C 43/52* (2013.01); *B29C 43/56* (2013.01); *B29C 43/58* (2013.01); *B29C 2043/029* (2013.01); *B29C 2043/3233* (2013.01); *B29C 2043/3605* (2013.01); *B29C 2043/3615* (2013.01); *B29C 2043/561* (2013.01); *B29C 2043/563* (2013.01); *B29C 2043/5816* (2013.01); *B29K 2101/12* (2013.01); *B29K 2105/0035* (2013.01); *B29L 2031/40* (2013.01); *B29L 2031/753* (2013.01)
(58) Field of Classification Search
  CPC ............ B29C 33/68; B29C 2043/5816; B29C 2043/3615; B29C 2043/3233; B29C 2043/029; B29C 2043/563; B29C 2043/561; B29C 2043/3605; B29C 51/36; B29C 2043/3628; B29L 2031/753; B29L 2031/40; B29K 2101/12; B29K 2105/0035; G01N 1/28
  See application file for complete search history.

(56) References Cited

U.S. PATENT DOCUMENTS

| | | | | |
|---|---|---|---|---|
| 5,254,293 | A | * 10/1993 | Flicstein | B29C 43/006 264/1.31 |
| 5,643,168 | A | * 7/1997 | Piramoon | B04B 7/085 494/16 |
| 5,928,680 | A | * 7/1999 | Tadion | G01N 21/3563 425/405.1 |
| 2007/0090554 | A1* | 4/2007 | Wykoff | B29C 43/36 264/102 |
| 2013/0210181 | A1 | 8/2013 | Preuss et al. | |
| 2015/0360425 | A1* | 12/2015 | Guha | B29C 43/02 264/550 |
| 2016/0200004 | A1* | 7/2016 | Ozawa | B29B 15/08 74/434 |
| 2016/0288428 | A1* | 10/2016 | Ozawa | B29C 37/00 |

FOREIGN PATENT DOCUMENTS

| | | |
|---|---|---|
| GB | 2316648 A | 3/1998 |
| JP | 2007-21725 A | 2/2007 |

OTHER PUBLICATIONS

Specac Ltd. Mar. 2012 Catalogue available from www.specac.com/userfiles/file/Specac2012Catalogue280212W.pdf (submitted in three parts).
English machine translation of Japanese Publication No. 2007-21725 A, dated Feb. 1, 2007, 9 pages.
International Search Report of corresponding PCT/EP2015/064547, dated Sep. 11, 2015, 8 pages.
Written Opinion of the International Searching Authority of corresponding PCT/EP2015/064547, dated Sep. 11, 2015, 14 pages.
British Search Report dated Dec. 17, 2014, corresponding to British Application No. GB1411400.3, 3 pages.
British Examination Report dated Nov. 23, 2016, corresponding to British Application No. GB1411400.3, 3 pages.

* cited by examiner

VACUUM COMPRESSION MOLDING

CROSS-REFERENCED TO RELATED APPLICATION(S)

This application is a US national phase application of International Patent Application No. PCT/EP20151064547, filed Jun. 26, 2015 and claiming the priority of British Patent Application No. 1411400.3, filed Jun. 26, 2014, the disclosures of which are hereby incorporated herein by reference.

TECHNICAL FIELD

The present invention relates to the field of molding a sample body of thermoplastic material, more specifically to an apparatus for molding a thermoplastic material into a homogenous sample body having a predetermined shape, a method of molding a thermoplastic material into a homogenous sample body having a predetermined shape, and a system for molding a thermoplastic material into a homogenous sample body having a predetermined shape.

BACKGROUND

There exists a variety of techniques for preparing sample bodies that are suitable for analysis in such methods as rheometry, X-ray fluorescence analysis, infrared spectroscopy, dissolution testing, etc. These techniques are confronted with the challenge of producing homogenous samples without air pockets or bubbles in a melting or solidification cycle. Many thermoplastic materials have high viscosity (>10 Pas) when in a molten state. Air located between the sample material particles during the melting process will be trapped as small bubbles within the melted material. It is usually the characteristics of the solid or molten sample material that are of interest in the analysis. However, many physical characteristics are strongly influenced by such embedded air bubbles. In the case of viscosity measurements, the results may e.g. vary with several decimal powers in dependency of the amount of air trapped within the sample and thereby cause inacceptable measuring uncertainty.

There are in principle two ways of controlling the amount of embedded air pockets in the sample:

(1) The sample may be melted under atmospheric conditions and the air bubbles rise due to the density difference and escape from the upper surface of the sample body. Due to the high viscosity, the speed with which the trapped air bubbles rise is very low. If the air bubbles are supposed to escape as a result of the lifting force only, a long time is needed. However, in many cases maintaining the sample at a high temperature for a long time may on the other hand lead to non-desirable sample degeneration and may thus affect the sample and the analysis result.

(2) The air bubbles may be prevented by melting the sample in a vacuum. The starting materials are evacuated at room temperature in a hermetically sealed chamber and then melted. No air is present between the particles during the melting, such that the particles melt into a homogenous sample. The critical influencing factors of this variation are the speed of evacuation of the sample chamber, the obtainable heating/cooling rates as well as possible sublimation or evaporation of the sample.

A variety of implementations of the above-mentioned principles exist, which are used in various situations:

A first example makes use of a vacuum oven. The sample is melted within a chamber that can be evacuated heated. The starting materials, i.e. powder or pellets, are placed in a mould or on a non-stick foil. Long cycle durations are usually needed, since such ovens due to their comparatively large volumes only allow for slow temperature control and evacuation. A further drawback of this method is the usually non-defined shape of the sample body. A clear advantage of this variant is that such an oven is commonly available as part of standard laboratory equipment.

A second example relies on a platen press, which consists of a movable plate and a stationary plate. Both plates are usually heatable and a well defined force may be applied to the movable plate, e.g. by means of hydraulics. Due to their versatility, platen presses belong to standard laboratory equipment. In such a press, the sample bodies are produced in special planar moulds. The mould is separated from the base plate by a separation foil and pellets or powder is filled into the openings of the mould and melted. The movable plate is pressed onto the mould and the samples are formed under well defined conditions. The drawbacks of this method comprise the facts that an expensive machine (vacuum platen press) is needed, and that the sample chamber is usually large such that it reacts slowly on changes in temperature and pressure. Samples produced in accordance with this method may further comprise shrinking cavities. This is due to the fact that the sample chamber volume is defined by the mould and may not adapt to the various conditions during production. The sample chamber is initially filled with the starting materials. Since solid bulk material has lower density than the pure substance, the mould is overfilled and a volume contraction occurs during the melting which often causes cavities to occur within the sample. Excess material due to overfilling is pressed between separation foil and mould.

A third example is based on a pellet pressing machine which is similar to machines used for pressing pills or tablets. In these machines, a chamber is filled with the starting materials (pellets or powder) and compressed from above by a punch. The pressing force is provided by means of a hydraulic or mechanical press. The compacting may take place under increased temperature and vacuum. Thereafter, the sample body is removed from the pressing tool. This step is problematic in connection with heated pressing, since many materials adhere to the surfaces of the pressing tool and therefore can only be released by application of extensive force. Such application of force often leads to destruction of the sample body. Therefore, this approach is only applicable to substances which only adhere weakly to the pressing tool or which can resist the mechanical loads during removal.

A fourth example uses an injection molding machine. In this case, the material is melted within a chamber and injected through a nozzle into a cold separable mould. This method provides sample bodies with homogenous shape and mass, when the melting takes place under vacuum. Accordingly, this way of sample body preparation constitutes the benchmark method. However, the main drawback is the significant cost with regards to acquisition of the necessary equipment as well as process development.

There may thus be a need for a simple and effective way of preparing homogenous sample bodies from thermoplastic material. In particular, there may be a need for a way of preparing such sample bodies in a rapid manner and at a relatively low cost.

SUMMARY OF THE INVENTION

This need may be met by the subject-matter according to the independent claims. Advantageous embodiments of the present invention are set forth in the dependent claims.

According to a first aspect of the invention, there is provided an apparatus for molding a thermoplastic material into a homogenous sample body having a predetermined shape. The apparatus comprises: (a) a main body comprising a first opening, a second opening and a hollow bore connecting the first opening with the second opening, the hollow bore being adapted to receive a separation foil shaped to cover at least a part of hollow bore surface; (b) a piston adapted to fit moveably into the hollow bore containing the separation foil; (c) a base plate comprising a protrusion, wherein the base plate is adapted to be inserted into the first opening in such a manner that the protrusion extends into a part of the hollow bore containing the separation foil, and wherein the base plate is adapted to transfer heat to and from a thermoplastic material resting on the protrusion; (d) a vacuum connector adapted to be connected to a vacuum source; and (e) a lid adapted to fit moveably into the second opening and to apply a force to the piston when the vacuum connector is connected to the vacuum source such that the piston applies a compressing force to the thermoplastic material resting on the protrusion.

This aspect of the invention is based on the idea that the apparatus allows thermoplastic material arranged within a hollow bore, the surface of which is at least partially covered with a separation foil, to be heated (and thereby melted) through the base plate and compressed by applying a vacuum through the vacuum connector such that the lid (and thereby the piston within the hollow bore) is forced towards the base plate. Once the sample body has been molded, it can easily be removed from the hollow bore together with the separation foil, i.e. by pulling the separation foil out of the hollow bore. Finally, after removing the separation foil from the sample body, the latter is ready for use.

In the present context, the term "separation foil" may in particular denote a sheet-like material, such as sheet metal or a woven sheet of metal or composite fibers, which can be folded into a tubular structure that fits into the hollow bore. It may consist of different layers or coating, as for example PTFE coated glass fiber or Kapton coated fibers.

The main body may in particular be made of a solid piece of metal, cast iron, ceramics, or plastics which show suitable chemical and temperature resistance, which has been processed such that the main body comprises the first opening, the second opening and the hollow bore extending between the first and second openings. The hollow bore may in particular have a substantially cylindrical shape, whereby the cross-section of the hollow bore may have a round (circular or elliptical), triangular, rectangular, quadratic or any other desirable form, e.g. tensile bars, that corresponds to the cross-sectional shape of the sample bodies that are to be produced with the apparatus. The hollow bore is adapted to receive a separation foil shaped to cover at least a part of the hollow bore surface in the sense that a suitably shaped separation foil, e.g. a separation foil folded into a tubular shape that fits into the hollow bore, may easily be inserted into the hollow bore when at least one of the base plate and the lid is not fitted into the first or second opening, respectively.

The piston may in particular be made of a different material than the main body, in particular a material with lower heat conductivity minimizing the heat flow towards the piston and therewith the heating duration. Particularly advantageous materials for the piston are PEEK (polyether ether ketone) and PTFE. The piston may be formed as a solid elongate element having a cross-sectional shape that fits tightly into the hollow bore (when a separation foil is inserted therein) in such a way that the piston may be easily moved along an axial direction within the hollow bore with separation foil while the space between separation foil and piston surface is kept low.

The base plate may particularly be made of the same material as the main body and it may have a cross-sectional shape that fits tightly into the first (or lower) opening of the main body such that the base plate is movable along the axial direction of the hollow bore while at the same time providing a substantially air-tight closing of the first opening.

The base plate comprises a protrusion, e.g. a substantially flat portion that is elevated relatively to the surface of the base plate that is supposed to point towards the interior of the main body when the base plate is inserted into the first opening. The protrusion may in particular be arranged at a position on the surface of the base plate, which is aligned with the hollow bore. Furthermore, the protrusion may particularly have a cross-sectional shape that fits tightly into the hollow bore (with separation foil) in the same manner as described above with regard to the piston. In other words, when the base plate is arranged in the first opening, the protrusion may extend into the hollow bore and thereby constitute a plug-like closure of the end of the hollow bore that faces the first opening.

The base plate is capable of transferring heat (e.g. from a heating unit, such as a heating plate on which the base plate is arranged) to a portion of material resting on the protrusion. It should be noted that this also means that the base plate is capable of cooling the portion of material resting on the protrusion in a similar fashion, e.g. when the base plate is arranged on a cooling surface that has a lower temperature than the portion of material.

The lid may also particularly be made of the same material as the main body and it may have a cross-sectional shape that fits tightly into the second (or upper) opening of the main body such that the lid is movable along the axial direction of the hollow bore while at the same time providing a substantially air-tight closing of the second opening.

The apparatus comprises a vacuum connector for connecting to a vacuum source. Thereby, when the piston is arranged in the hollow bore (with separation foil), the base plate is arranged in the first opening, and the lid is arranged in the second opening, the lid and the base plate will be forced towards each other when a vacuum is applied (such that the hollow bore and parts of the first and second openings are evacuated), and thereby the lid will push the piston in the axial direction of the hollow bore towards the base plate such that the piston applies a compressing force to the thermoplastic material resting on the protrusion.

In operation, once the sample material is arranged on the protrusion and the piston, base plate and lid are positioned in their relevant openings of the main body, the vacuum source may be connected as a first step. Thereby, the base plate and lid are forced towards each other such that the piston compresses the sample material within the hollow bore. Then, as a second step, heat may be applied through the base plate such that the sample material melts. The vacuum is maintained during the melting process, such that the material is continuously compressed. Once the sample body is finished (and preferably has been cooled down), the apparatus may be disassembled by removing at least the lid and the piston such that the separation foil containing the probe body can be removed. By finally removing the separation foil, which is possible without causing damage to the side surface of the probe body, e.g. by unfolding or unwrapping the separation foil, the final probe body is provided and ready for use, e.g. analysis.

Accordingly, the apparatus according to this aspect is capable of pressing a molten sample material into a desired shape by connecting the apparatus to a vacuum source or pump, i.e. without the need for complex and expensive mechanical or hydraulic constructions. Furthermore, the construction of the apparatus is relatively simple and thus inexpensive. For using the apparatus, only inexpensive standard laboratory equipment, such as e.g. a vacuum source and a heating plate, is needed. Due to the relatively small size of the apparatus, it is possible to rapidly adjust temperature and pressure, such that the thermal stress on the sample can be kept at a minimum. Finally, the apparatus is capable of processing almost the entire amount of starting material into a homogenous sample. Thereby, the apparatus is very useful for preparing sample bodies containing expensive substances, such as active pharmaceutical ingredients and formulations in connection with development within the pharmaceutical field.

According to an embodiment of the invention, (a) the protrusion is an integral part of the base plate, or (b) the protrusion is a separate part adapted to be detachably arranged on the base plate.

In the latter case, i.e. where the protrusion is a separate part, the protrusion may be selected from a group of protrusions having different characteristics, such as size, shape, etc. to fit a particular task.

According to a further embodiment of the invention, (a) the base plate is adapted to transfer heat between an external heating and/or cooling unit and the thermoplastic material, or (b) the base plate comprises an integrated heating and/or cooling unit.

In the first case, the base plate may be adapted to be connected to, e.g. placed on, an external heating/cooling unit, to thereby transfer heat between the external unit and the thermoplastic material.

In the second case, the base plate is equipped with an internal heating/cooling unit, such as an internal resistance heater, a Peltier-element, or heating/cooling channels for allowing a flow through of tempering fluids, etc.

According to a further embodiment of the invention, the base plate is adapted to be firmly connected to the main body.

In particular, the base plate may be connectable to the main body by means of a thread or a mechanical interlocking system, such as a bayonet closure. Thereby, in addition to the force balance caused by application of vacuum, a further locking of the position between base plate and main body may be obtained.

According to a further embodiment of the invention, the cross sectional area of the first opening is larger than the cross sectional area of the second opening.

Thereby, a greater pressing force may be applied from the base plate to the main body than the pressing force that is applied to the piston by the lid. Thus, the force balance always results in a contact pressure between base plate and main body such that a tight contact is assured and the position remains fixed.

According to an embodiment of the invention, the main body further comprises at least one hollow bypass channel (e.g. a bore, groove etc.) extending between the first opening and the second opening.

In other words, the at least one hollow bypass channel provides a further connection (in addition to that provided by the hollow bore) between the first opening and the second opening. That is, the hollow bypass channel may extend substantially in parallel with the hollow bore through the main body.

The at least one hollow bypass channel assists in providing uniform pressure loads within the apparatus during operation. In particular, if the molten probe material closes the hollow bore completely (in an air-tight manner), e.g. during heating, the at least one hollow bypass channel prevents that inevitable leakage flows causes an increase in pressure within the apparatus in the vicinity of the first opening (i.e. the lower part of the apparatus). Such pressure increase would at first cause a reduction in the pressing force of the piston on the sample material and may eventually lead to an ejection of the base plate from the first opening in the main body, such that the sample material may leave the apparatus.

It is explicitly noted that the apparatus may comprise more than one hollow bypass channel. In this case, the plurality of the hollow bypass channels is preferably symmetrically distributed around the hollow bore in order to provide a maximum uniformity of the pressure loads within the apparatus during operation.

According to a further embodiment, the vacuum connector is comprised by the lid, the main body or the base plate.

The vacuum connector is arranged such that the interior of the apparatus can be evacuated by connecting the vacuum connector to a vacuum source.

In one embodiment, the apparatus may comprise two vacuum connectors, e.g. one in the lid and one in the base plate. In this case, there is no need for a bypass channel (or other distribution channel) within the apparatus.

According to a further embodiment of the invention, the first opening and the second opening of the main body are formed as cylindrical cut-out portions at opposing sides of the main body.

In other words, the first opening and the second opening have cylindrical walls constituted by the outer surface part of the main body and extend so far into the main body that they are in communication with the hollow bore. The second opening may in particular extend somewhat further (i.e. deeper) into the main body than the first opening in order to allow sufficient room for the piston.

According to a further embodiment of the invention, the apparatus further comprises: (a) a first sealing for providing a gas tight connection between the base plate and the main body when the base plate is inserted into the first opening of the main body; and/or (b) a second sealing for providing a gas tight connection between the lid and the main body when the lid is inserted into the second opening of the main body.

The first sealing may in particular be arranged between the inner cylindrical surface of the first opening and the outer side surface of the base plate. More specifically, the first sealing may in particular be implemented as an O-ring, e.g. made of rubber, which is fitted around the outer periphery of the base plate.

In a similar manner, the second sealing may in particular be arranged between the inner cylindrical surface of the second opening and the outer side surface of the lid. More specifically, the second sealing may in particular be implemented as an O-ring, e.g. made of rubber, silicone, Viton, PTFE etc., which is fitted around the outer periphery of the lid.

According to a further embodiment of the invention, the apparatus further comprises a temperature sensor arranged in the base plate or in the piston and adapted to provide an output signal indicative of the temperature in the vicinity of the thermoplastic material resting on the protrusion.

The temperature sensor may in particular be embedded within the base plate. The output signal may be an electrical signal provided via a cable extending from the base plate or through a socket in the base plate.

The temperature sensor may in particular be embedded within the piston. The output signal may be an electrical signal provided via a cable extending from the piston through the vacuum connector and gas tight lead-through of the cable through the vacuum hose or lid assembly.

The output signal from the temperature sensor may be used as a feedback signal for automatically controlling a heating plate during operation or it may be used to provide an indication and the opportunity to record processing data for documentation purposes, e.g. via a display, to an operator during use of the apparatus.

According to a further embodiment of the invention, the apparatus further comprises a spacer ring adapted to be arranged between main body and lid to control the compression force.

More specifically, the spacer ring may be formed in such a way that it can be fit around the piston. The thickness of the spacer ring is chosen to limit movement of the lid in the direction towards the base plate, such that the compression force applied to a sample material by the piston is limited accordingly.

The particular spacer ring may be chosen from a selection of spacer rings having different thicknesses in view of the particular application.

According to a further embodiment, the apparatus further comprises a first pressing unit (e.g. a spring) adapted to act between lid and main body in order to reduce the pressing force and/or a second pressing unit (e.g. a spring) adapted to be arranged between lid and piston in order to establish the pressing force when the lid mobility is limited by a spacer ring.

By use of the first and/or second pressing unit(s), the control of the pressing force may further improved.

According to a further embodiment of the invention, the apparatus further comprises an internal heating/cooling unit arranged in the main body, in the piston or in the lid.

The internal heating/cooling unit may in particular be implemented as an electric resistance heater, cooling channels flushed with fluids, heat pipes, Peltier-elements, inductive heating, etc.

The internal heating/cooling unit may contribute to a uniform heating/cooling of the sample material by providing further heating/cooling in addition to that provided by or through the base plate.

According to a further embodiment of the invention, the main body comprises a thermally conducting inner element and an outer element.

In other words, the main body is formed of two separate elements, an inner element and an outer element. The inner element is thermally conducting and thus capable of efficiently transmitting heat to the thermoplastic material and the piston. Thereby, efficient heating can be provided.

According to a further embodiment of the invention, the main body further comprises a thermally insulating intermediate element adapted to be arranged between the inner element and the outer I element of the main body.

In other words, the main body is thermally separated into an inner part (formed by the thermally conducting inner element) and an outer part (formed by the outer element) by the thermally insulating intermediate element.

Thereby, the thermoplastic material and the piston may be efficiently heated through the sides while heat loss to the outer cylindrical element of the main body is prevented by the intermediate element. Accordingly, the cycle time may be shortened due to improved temperature distribution within the vicinity of the sample chamber.

Each of the inner element, the outer element and the thermally insulating intermediate element may preferably be formed as cylindrical elements, having a circular, elliptical, rectangular, quadratic or polygonal cross sectional shape.

According to a second aspect of the invention, there is provided a method of molding a thermoplastic material into a homogenous sample body having a predetermined shape. The method comprises: (a) providing a main body comprising a first opening, a second opening and a hollow bore connecting the first opening with the second opening; (b) arranging a first separation foil within the hollow bore such that the first separation foil covers at least a part of the hollow bore surface; (c) inserting a base plate comprising a protrusion into the first opening of the main body such that the protrusion extends into a part of the hollow bore containing the first separation foil; (d) arranging a portion of thermoplastic material in the hollow bore such that it rests on the protrusion; (e) inserting a piston into the hollow bore containing the first separation foil, the piston being adapted to fit moveably into the hollow bore containing the separation foil; (f) inserting a lid into the second opening, the lid being adapted to fit movably into the second opening; (g) connecting a vacuum connector to a vacuum source, whereby the lid applies a force to the piston such that the piston applies a compressing force to the thermoplastic material resting on the protrusion; and (h) applying heat to the portion of thermoplastic material resting on the protrusion such that it is heated and melted, thereby forming a homogenous sample body.

This aspect of the invention is essentially based on the same idea as the first aspect described above, whereby this aspect of the invention relates to a method of molding a thermoplastic material into a homogenous sample body by using an apparatus according to the first aspect or any one of the above described embodiments.

More specifically, a first piece of separation foil is folded or wrapped into a suitable (e.g. tubular) shape and arranged in the hollow bore in the main body. The base plate is inserted into the first (e.g. lower) opening in the main body such that the protrusion extends into the hollow bore and substantially closes the end of the hollow bore that is in communication with the first opening. Then, a portion of thermoplastic sample material (e.g. powder or pellets) is filled into the hollow bore and the piston is inserted such that the sample material is contained between the protrusion and the piston. Then, the lid is arranged in the second (e.g. upper) opening of the main body and a vacuum connector is connected to a vacuum source such that a chamber formed between the base plate and the lid is evacuated, whereby the base plate and the lid are forced towards each other such that the piston applies a compressing force to the portion of material resting on the protrusion. Finally, heat is applied to the thermoplastic material, e.g. by placing the base plate on a heating plate, whereby the thermoplastic material is melted and compressed (due to the vacuum) into a homogenous sample body.

The resulting sample body has a predetermined shape essentially defined by the hollow bore (and the separation foil) and the contacting surfaces of the piston and protrusion. The sample body is homogenous and free of air bubbles. After removing the first separation foil containing the sample body from the hollow bore, the first separation foil may be easily separated from the sample body without causing damage to the latter, e.g. by unfolding or unwrapping the first separation foil.

According to an embodiment of the invention, the method further comprises: (a) prior to the step of arranging the portion of thermoplastic material in the hollow bore, arranging a second separation foil on the surface of the protrusion; and (b) after the step of arranging the portion of thermoplastic material in the hollow bore, arranging a third separation foil on top of the portion of thermoplastic material.

In other words, a second piece of separation foil is arranged between the surface of the protrusion and the sample material, and a third piece of separation foil is arranged between the sample material and the pressing surface of the piston. Thereby, adhesion of the molten sample material to the surfaces of the protrusion and piston can be prevented and damage to the corresponding surfaces of the final probe body can be prevented in essentially the same manner as described above with regard to the first separation foil. That is, when the molded sample body is removed from the hollow bore, it is surrounded by the first, second, and third pieces of separation foil. These foils may be easily separated from the sample body without causing surface damage.

The second and third separation foils may in particular have a shape that matches the cross-section of the hollow bore, e.g. a disc-like shape, rectangular etc. Furthermore, the second and third separation foils may in particular be made from the same or a similar material as the first separation foil.

According to a further embodiment of the invention, the method further comprises: (a) disconnecting the vacuum connector from the vacuum source; (b) removing the homogenous sample body and surrounding separation foil(s) from the hollow bore; and (c) removing the separation foil(s) from the homogenous sample body.

In other words, this embodiment comprises a set of final steps (after the actual molding process within the apparatus), which leads to a final sample body that is ready for use, e.g. analysis in a laboratory.

According to a third aspect of the invention, there is provided a method of molding a sample body comprising a plurality of sample body components and having a predetermined shape. The method comprises (a) molding a first sample material into a first sample body component using an apparatus according to the first aspect or any of the above embodiments, and (b) molding the first sample body component and a second sample material into a sample body using an apparatus according to the first aspect or any of the above embodiments.

In other words, a sample body comprising two or more body components (e.g. made from different materials) in the form of e.g. a stacked structure or a core surrounded by another material can be precisely molded by using the same or several different instances (with different dimensions) of the apparatus according to the first aspect.

According to an embodiment of the invention, the second sample material is a second sample body component that has been molded using an apparatus according to the first aspect or any of the above embodiments.

In other words, two (or more) molded body components are molded into a combined sample body by repeated use of the apparatus and method.

According to a fourth aspect of the invention, there is provided a system for molding a thermoplastic material into a homogenous sample body having a predetermined shape. The system comprises: (a) an apparatus according to the first aspect or any of the above embodiments; (b) a piece of separation foil for insertion into the hollow bore; (c) a vacuum source adapted to be connected to the vacuum connector of the apparatus; and (d) a heating unit adapted apply heat to the base plate of the apparatus.

This aspect is essentially based on the same idea as the first aspect and consists of an apparatus according to the first aspect and the further tools and utilities necessary to operate the apparatus.

According to an embodiment of the invention, the system further comprises a cooling unit for cooling the molded sample body of thermoplastic material.

The cooling unit may be formed integrally with the heating unit or it may be constituted as a separate unit, e.g. a cooling plate on which the base plate of the apparatus may be arranged. Alternatively, the cooling unit may be adapted to receive the entire apparatus and cool it, e.g. in a cooling chamber.

According to a further embodiment, the system further comprises a pressing unit adapted to apply additional force to the lid and piston.

The pressing unit may in particular be a mechanical, electro-mechanical, pneumatic or hydraulic pressing unit designed to apply a force to the lid of the apparatus and thereby also to the piston.

Thereby, a larger compacting force can be applied to the thermoplastic material than that caused by the vacuum alone.

According to a further embodiment, the system further comprises a pressing unit adapted to apply additional force to the lid and main body.

The pressing unit may in particular be an adjustable spring arranged to apply an additional force to the lid and main body in order to either ease the pressing force or to increase the same.

According to an embodiment, the base plate, the main body, the piston, or lid is equipped with an internal heating and cooling device. It can be established as electric resistance heater, cooling channels flushed with fluids, heat pipes, Peltier-elements, inductive heating etc.

In general, the design of the apparatus may in particular be carried out in a modular manner. More specifically, the hollow bore which contains the sample can be equipped with various inserts forming a smaller hollow bore. The smaller bore diameter requires also smaller pistons. Thus, different shaped samples can be produced with the apparatus. Similarly, the protrusion of the base plate may be implemented in a detachable modular manner.

Furthermore, a multiple number of hollow bores forming a multiple number of sample chambers may be established. Thus, a multiple number of samples can be produced with one melting cycle.

The movement of the lid may be limited with spacers between the main body and the lid. The spacers can be made of a solid rigid material, a soft material or be implemented as a spring. Thereby, the compression force during the melting cycle can be adjusted.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

DETAILED DESCRIPTION

Figure 1:
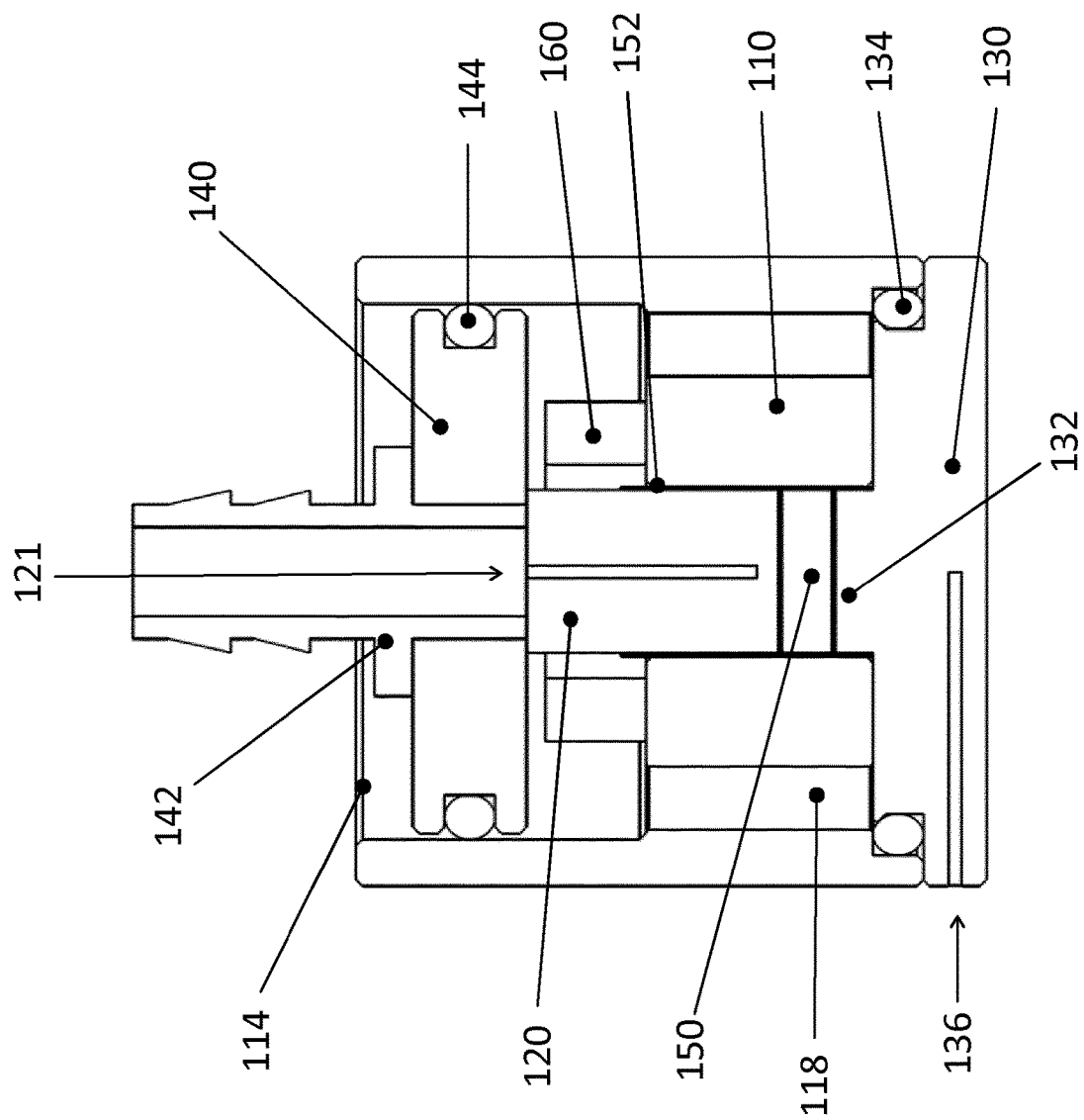
FIG. 1 shows a sectional view of an apparatus in accordance with an embodiment.

The illustration in the drawing is schematic. It is noted that in different figures, similar or identical elements are provided with the same reference numerals or with reference numerals which differ only within the first digit.

Figure 2:
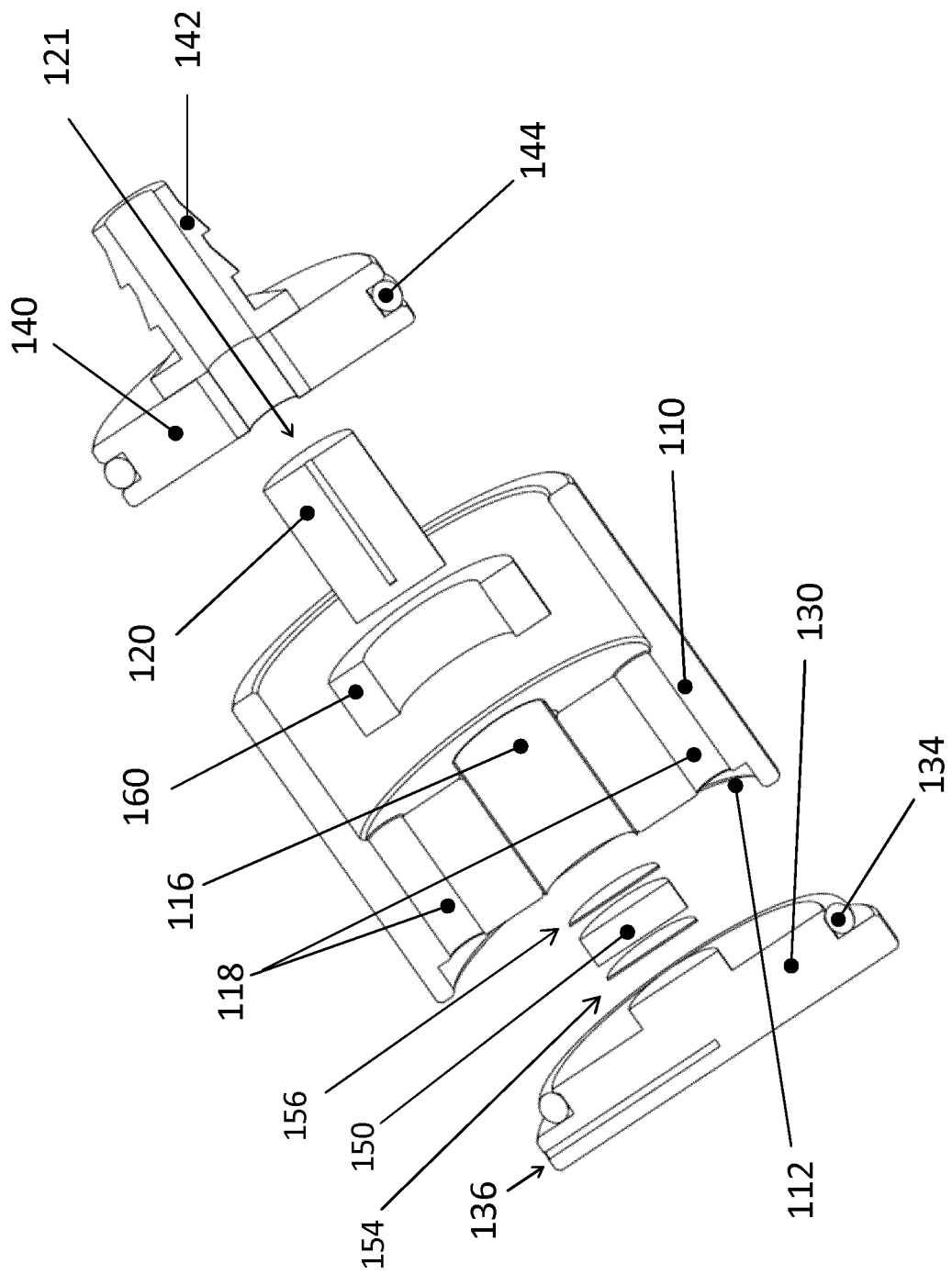
FIG. 2 shows an exploded view of the apparatus shown in FIG. 1.

FIGS. 1 and 2 show respectively a sectional view and an exploded view of an apparatus 100 in accordance with an embodiment. More specifically, the apparatus 100 comprises a main body 110, a piston 120, a base plate 130, and a lid 140. The main body 110 generally consists of a cylindrical piece of solid material, such as metal, cast iron, ceramics, or plastics, and comprises a lower (first) opening 112 into which the base plate 130 can be inserted, an upper (second) opening 114 into which the lid 140 can be inserted and a central hollow bore 116 extending through the main body 110 such that it provides communication between the lower opening 112 and the upper opening 114. The main body 110 further comprises two hollow bypass bores 118 extending through the main body 110 in parallel with the central hollow bore 116 at either side thereof. The hollow bore 116 has a cylindrical cross-section designed to receive the piston 120, which is generally made from a solid part of material, e.g. PEEK, metal, plastic, ceramics or composite materials. A temperature sensor 121 is also provided in the piston 120.

A spacer ring 160 in the form of a cylindrical ring with a slightly larger inner diameter than the hollow bore 116 is arranged to provide a stop position for the lid 140 and to prevent a collision between the tubular cylindrical separation foil (see below) and the lid 140. The diameter of the piston 120 is a bit smaller than the diameter of the hollow bore 110 such that the piston can be moved up and down even if a separation foil (see below) is fitted within the hollow bore 110.

The base plate 130 is shaped to fit tightly into the lower opening 112 and comprises a central protrusion 132 designed to fit into the lower part of the hollow bore 120. The base plate 130 further comprises an O-ring 134 surrounding a part of the outer periphery of the base plate 130 in order to provide an air-tight seal between the base plate 130 and the main body 110 when the base plate 130 is inserted into the lower opening 112. A temperature sensor 136 is also provided in the base plate 130.

The lid 140 is shaped to fit tightly into the upper opening 114 and comprises an O-ring 144 surrounding a part of the outer periphery of the lid 140 in order to provide an air-tight seal between the lid 140 and the main body 110 when the lid 140 is inserted into the upper opening 114. The lid 140 further comprises a vacuum connector 142 for connecting the apparatus 100 to a vacuum pump (not shown), e.g. by means of a hose. The lid 140, the hose or vacuum connector 142 may comprise a gastight lead-through for a temperature couple connection.

Figure 3:
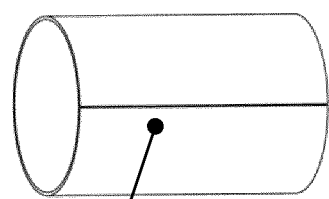
FIG. 3 shows a detailed view of two pieces of separation foil for use in the apparatus shown in FIGS. 1 and 2.
Figure 3:
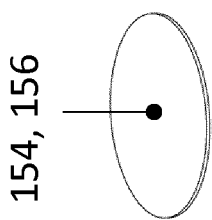

Also shown in FIGS. 1 and 2 are a portion of sample material 150, a tubular cylindrical separation foil 152 arranged within the hollow bore 116, and two disc-shaped separation foils 154, 156 arranged respectively between the protrusion 132 and the sample material 150 and between the sample material 150 and the piston 120. The separation foils 152, 154, and 156 serve to prevent the sample material 150 from adhering to the inner surfaces of the molding apparatus, i.e. the surfaces of the protrusion 132, the hollow bore 116 and the piston 120. As shown in FIG. 3, the separation foil 152 is formed by wrapping a rectangular (or quadratic) piece of separation foil into a tubular structure. The separation foils 154 and 156 are discs cut out to fit the diameter of the hollow bore 116.

Figure 4:
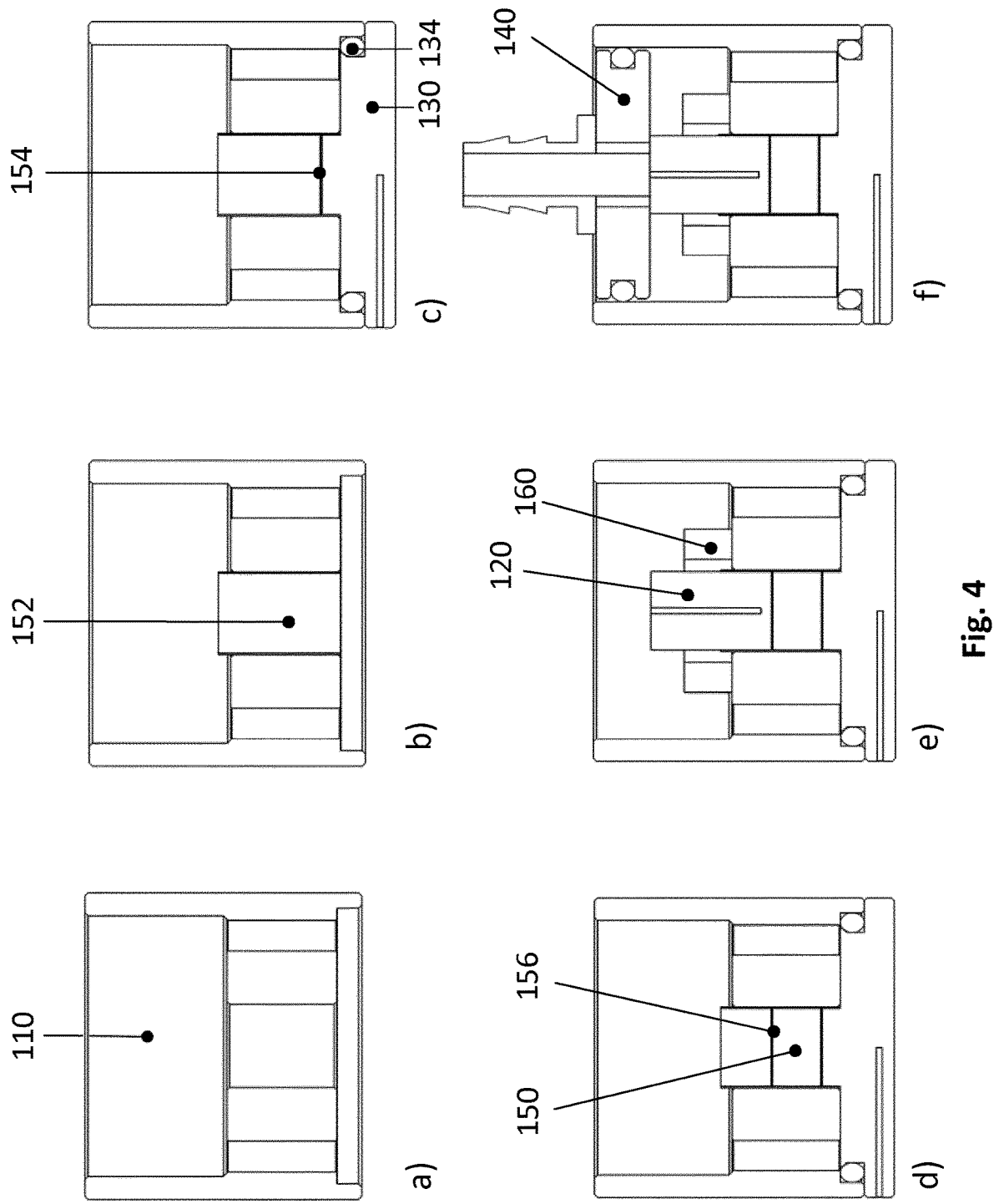
FIG. 4 shows a sequence of sectional views of the apparatus shown in FIG. 1 in various states during preparation for operation.

FIG. 4 shows a sequence of sectional views a) to f) of the apparatus 100 shown in FIGS. 1 and 2 in various states during preparation for operation. More specifically, FIG. 4 shows a sequence of steps during assembly of the apparatus 100 and filling it with sample material. That is, sectional view a) shows the main body 110 which is the first piece of the apparatus 100 to be provided during assembly and filling. In sectional view b), a tubular separation foil 152 has been inserted into the hollow bore 116 in the main body in such a way that the lower edge of the separation foil 152 is leveled with the lower end of the hollow bore 116 while the upper edge of the separation foil 152 extends slightly into the upper opening 114 of the main body 110. In sectional view c), the base plate 130 is fitted with O-ring 134 and inserted into the lower opening 112 of the main body 110 such that the protrusion 132 extends into the tubular release foil 152 within the hollow bore 116. Furthermore, a disc-shaped release foil 154 is arranged on the upper surface of the protrusion 132. In sectional view d), a portion of sample material 150 has been filled into the tubular release foil 152 and covered with a further disc-shaped release foil 156. In sectional view e), the piston 120 is inserted into the tubular release foil 152 and rests on top of the sample material 150 which is covered by the release foil 156. The spacer ring 160 is aligned around the protruding piston and release foil and leveled with lower end of the first opening 112. In sectional view f), the lid 140 is inserted into the upper opening 114 of the main body 110 and rests on the head of the piston 120. The apparatus is now assembled, loaded with probe material 150, and thus ready for operation.

Figure 5A:
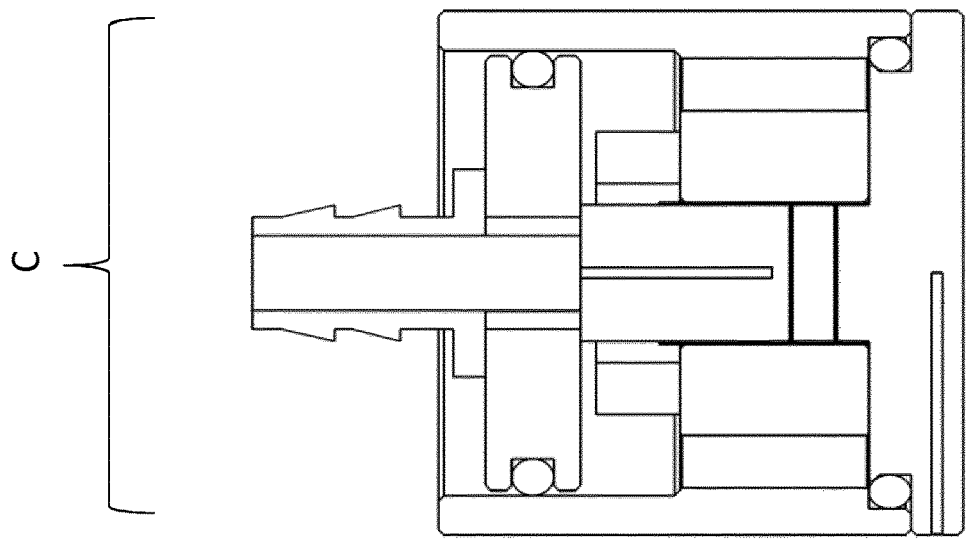
FIG. 5A shows a sequence of sectional views of the apparatus shown in FIGS. 1 and 2 in various states during operation.
Figure 5A:
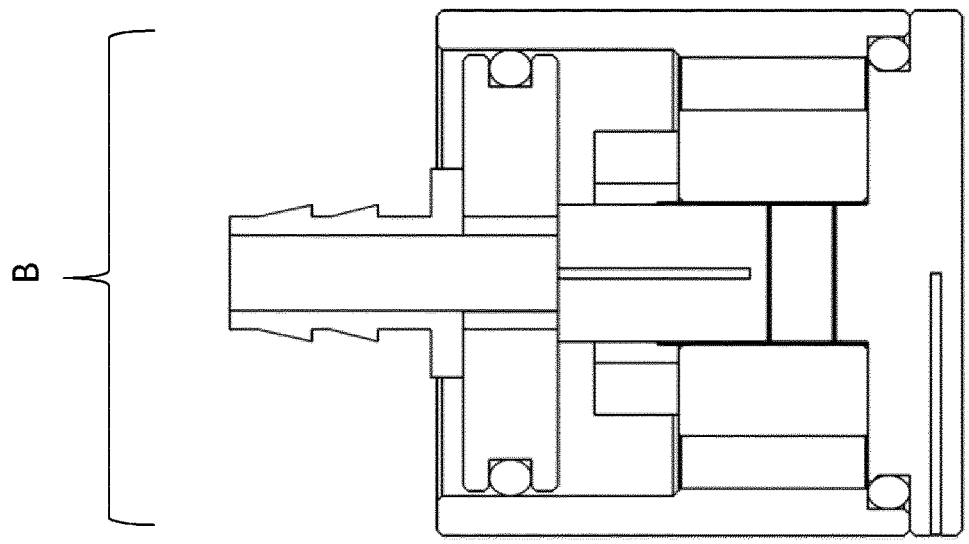
Figure 5A:
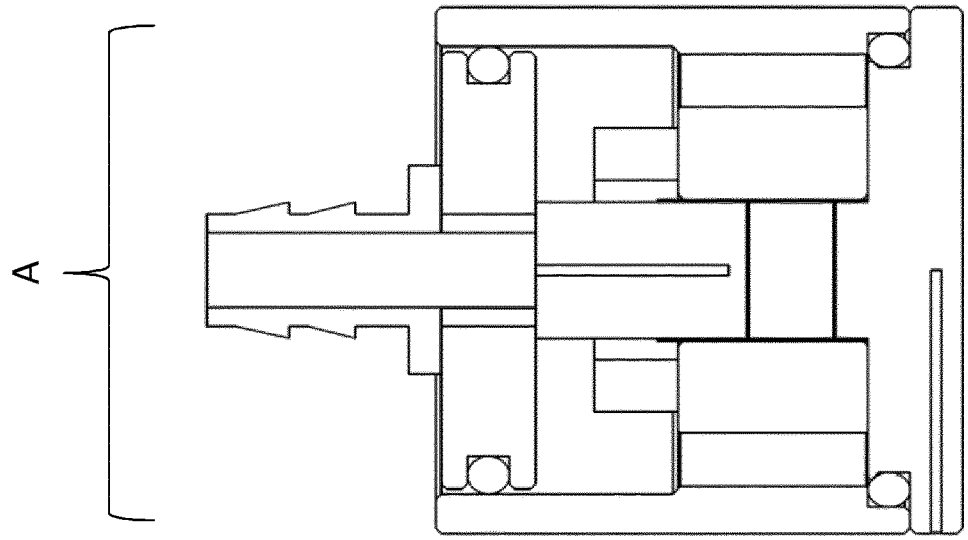

FIG. 5A shows a sequence of sectional views of the apparatus shown in FIGS. 1 and 2 in various states during operation. More specifically, the sectional view A shows a state following f) in FIG. 4 in which a vacuum is applied through vacuum connector 142 such that the piston compresses the sample material 150 and humidity or other volatile materials is allowed to leave the sample material 150. Sectional view B shows a later state where the sample material 150 is heated and melted, e.g. by conducting heat from a heating element (not shown), e.g. an electrical heating plate, a Peltier-element, etc., through the base plate 130. Sectional view C shows a yet later state in which the compressed and molten sample body is allowed to cool off, either by natural convection or by application of a suitable cooling device and/or medium.

Figure 5B:
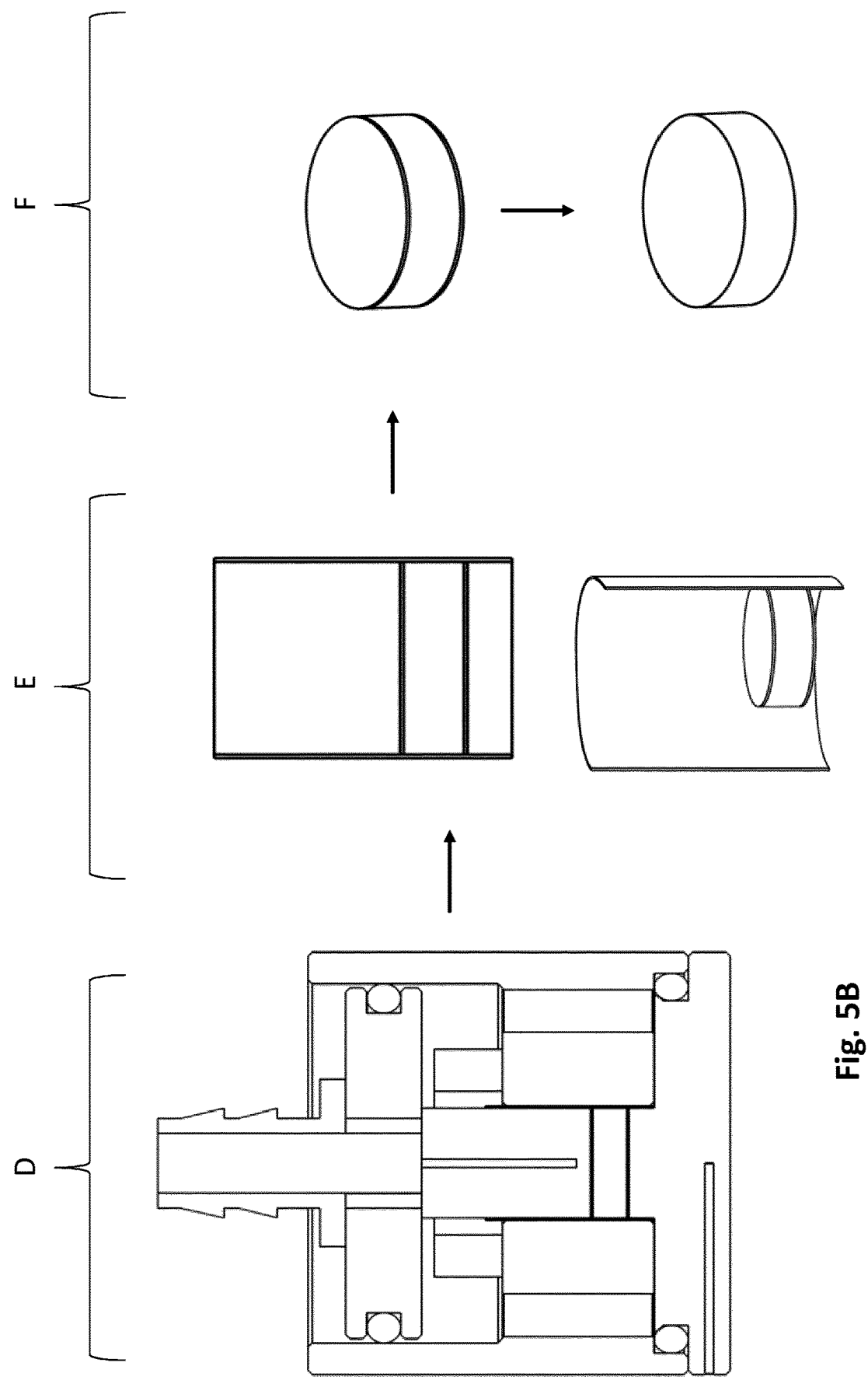
FIG. 5B shows a sequence of operations for finalizing preparation of a sample body in accordance with an embodiment.

Finally, FIG. 5B shows a sequence of operations for finalizing preparation of a sample body in accordance with an embodiment. More specifically, the state D in FIG. 5B follows directly after the state C in FIG. 5B and depicts a state where the molding of the sample body has been finalized and the sample body (covered by release foils 152, 154, and 156) may be removed from the apparatus 100 after removal of the lid 140 and piston 120. The removal of sample body and release foils is shown in E. As shown in the upper part of E, the sample body is removed as a package surrounded by the tubular release foil 152 and covered with release foil discs 154 and 156 on the lower and upper surfaces of the sample body, respectively. As shown in the lower part of E, the tubular release foil is removed first by carefully unfolding the rectangular piece of release foil such that the side surface of the sample body is not damaged. Finally, as shown in F, also the release foil discs 154 and 156 are removed and the molded sample body is finalized and ready for use.

Figure 6B:
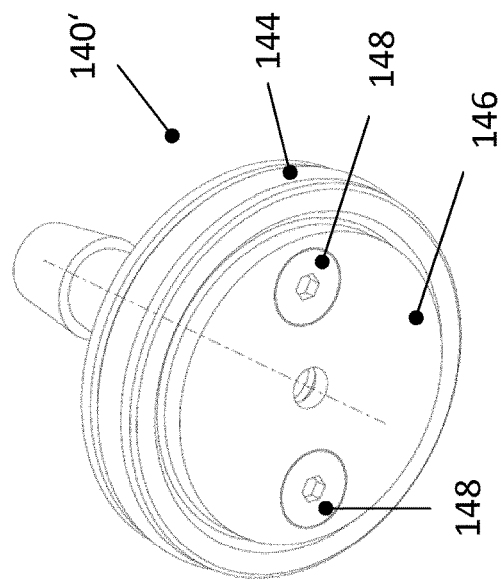
FIG. 6B shows a detailed view of a lid in accordance with the embodiment of FIG. 6A.
Figure 6A:
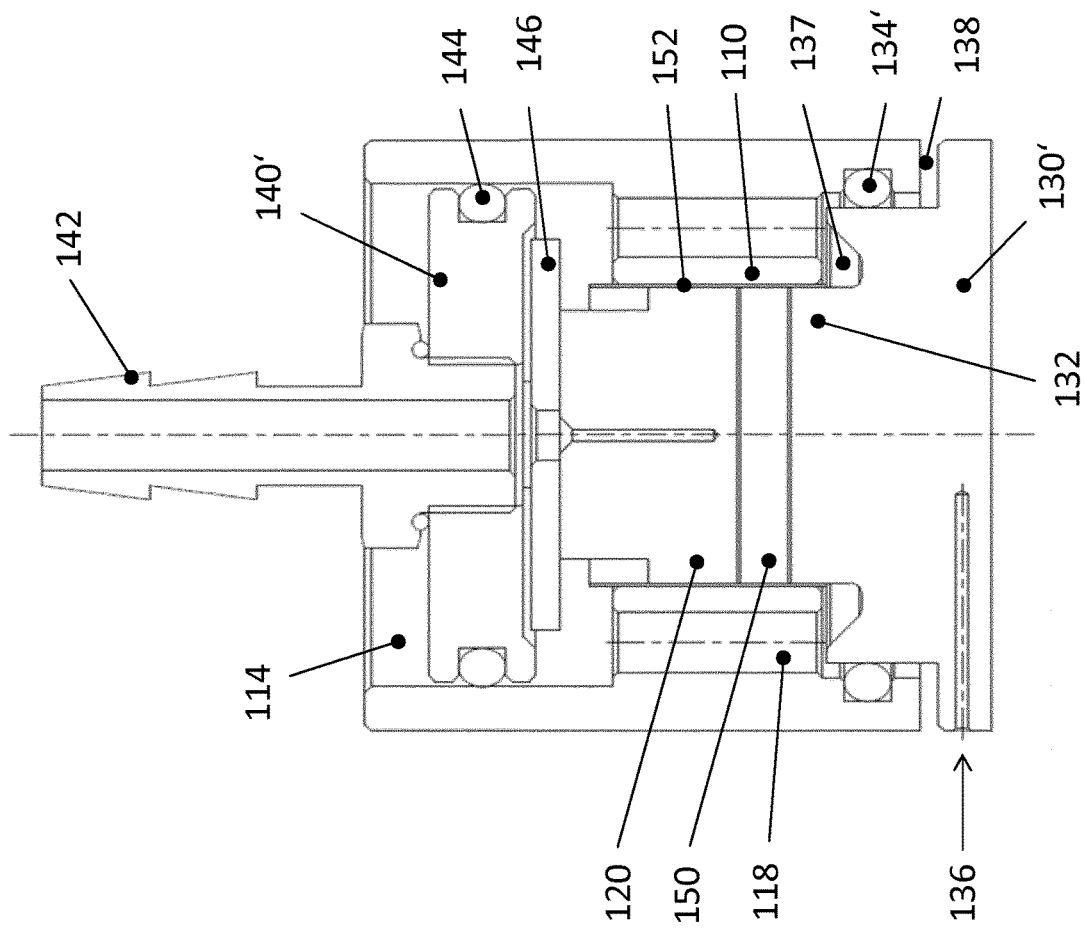
FIG. 6A shows a sectional view of an apparatus in accordance with an embodiment.

FIG. 6A shows a sectional view of an apparatus in accordance with a further embodiment. The apparatus shown in FIG. 6 is essentially similar to the apparatus discussed above in conjunction with FIGS. 1 to 5B with a few differences. A first difference relates to the lid 140', which in some regards differs from the lid 140 shown in FIGS. 1 to 5B. FIG. 6B shows a detailed view of the lid 140'. A second difference relates to the base plate 130', which in some regards differs from the base plate 130 shown in FIGS. 1 to 5B. In order to avoid unnecessary repetitions, only these differences will be discussed in the following.

In this embodiment, the lid 140' comprises a protruding section 146 on its lower side, i.e. the side that is facing the piston 120. The protruding section 146 has a slightly smaller circumference than the remaining part of the lid 140' and comprises two openings arranged diametrically opposite and close to the outer perimeter of the protruding section 146 in fluid communication with the vacuum connector. Thereby, the contact between lid 140' and piston 120 during operation may be improved and the application of vacuum may be more effective in comparison to the structure of the lid 140 shown in FIGS. 1 to 5B.

The base plate 130' also has some differences in comparison to the base plate 130 shown in the previous embodiments. First of all, an undercut 137 is provided in the upper part of the base plate 130' adjacent to the outer radial perimeter of the protrusion 132. The undercut 137 facilitates the handling of the device, in particular the insertion of the base plate, as it makes it easier for an operator to fit the protrusion 132 into the hollow bore 116 (see FIGS. 1 and 2 for comparison) without causing damage to the separation foil 152. Thus, in addition to improved handling, the possibility of reusing the separation foil 152 is increased.

A further difference of the base plate 130' in comparison to the above-described base plate 130 is that it is designed to leave a gap 138 between the main body 110 and the base plate 130' when the device is assembled. The gap 138 facilitates handling of the device after use as it becomes easier for an operator to pull the base plate 130' out of the main body 110. More specifically, the gap 138 makes it easier for the operation to get a good grip on the base plate 130'.

Finally, also the main body 110 shows a minor change in this embodiment. More specifically, in comparison to the previously described embodiments, an O-ring 134' is arranged in a recess in the lower part of the main body 110 instead of the O-ring 134 surrounding the base plate in, e.g., FIGS. 1 and 2. Also this modification improves the handling of the device, as the O-ring 134' is less prone to getting stuck at the surface of the base plate 130'.

Figure 7:
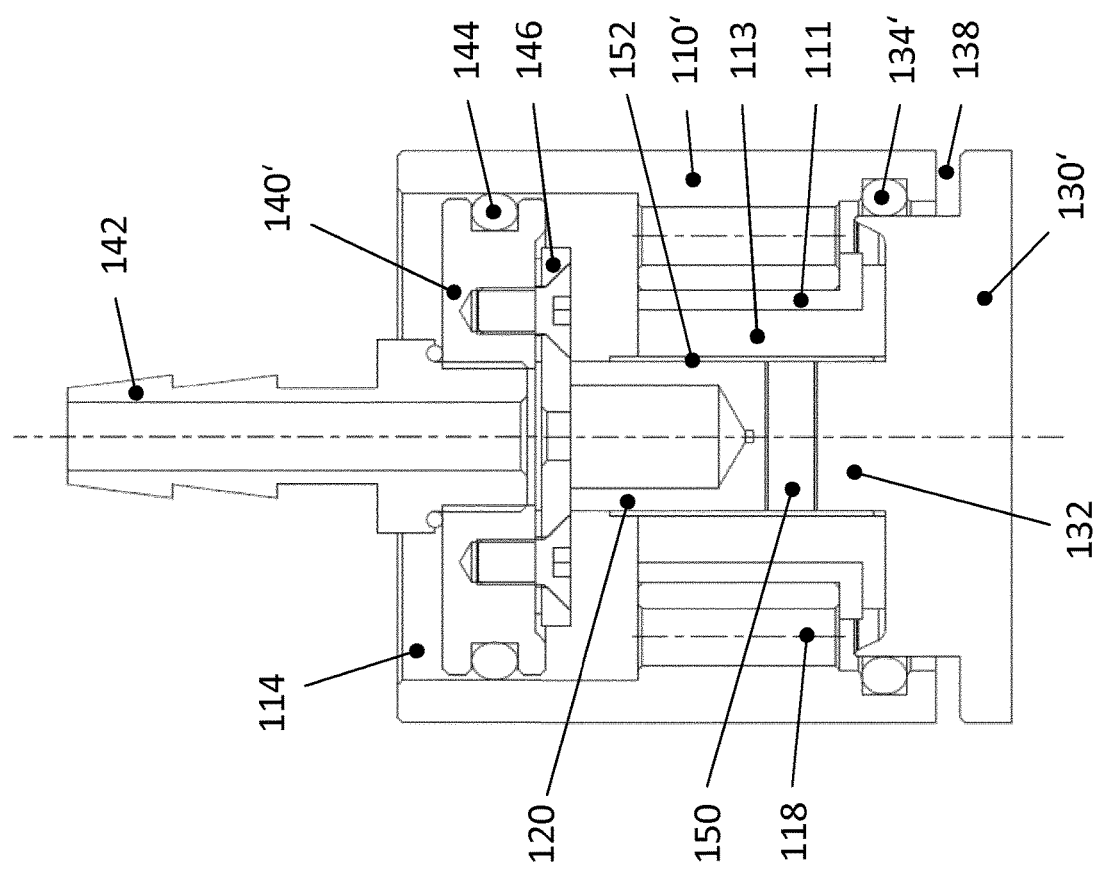
FIG. 7 shows a sectional view of an apparatus in accordance with an embodiment.

FIG. 7 shows a sectional view of an apparatus in accordance with a further embodiment. This embodiment differs from the embodiment shown in FIGS. 6A and 6B in the construction of the main body 110', which in some regards differs from the main body 110 shown in FIGS. 1 to 6A.

More specifically, the main body 110' comprises an inner cylindrical element 113 for contacting the separation foil 152 and an intermediate cylindrical element 111 arranged between the inner cylindrical element 113 and the remainder of the main body 110'. The inner cylindrical element 113 is made of a material with a high thermal conductivity, such as aluminum, while the intermediate cylindrical element 111 is made of a thermally insulating material, such as PEEK. This structure provides an improved and more uniform heating of the probe material 150 during operation. More specifically, heat transmission to the side portion of the probe material is enabled from the base plate through the inner cylindrical element 113 and through the separation foil 152. The intermediate cylindrical element 111 prevents distribution of the heat to the remained of the main body 110', which would lead to higher loss and thus slower heating of the probe material 150.

The inner cylindrical element 113 and the intermediate cylindrical element 111 may be provided in a series of different sizes to fit corresponding sizes of the protrusion 132. Thereby, sample bodies with different diameters may be molded by one single device by simply selecting the appropriate inner and intermediate cylindrical elements 113 and 111.

Figure 8B:
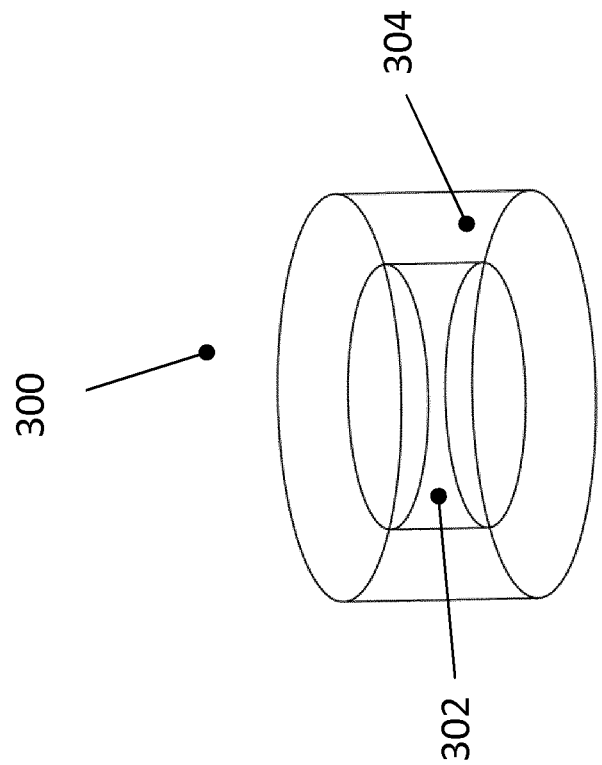
FIG. 8B shows a coated sample body manufactured in accordance with an embodiment.
Figure 8A:
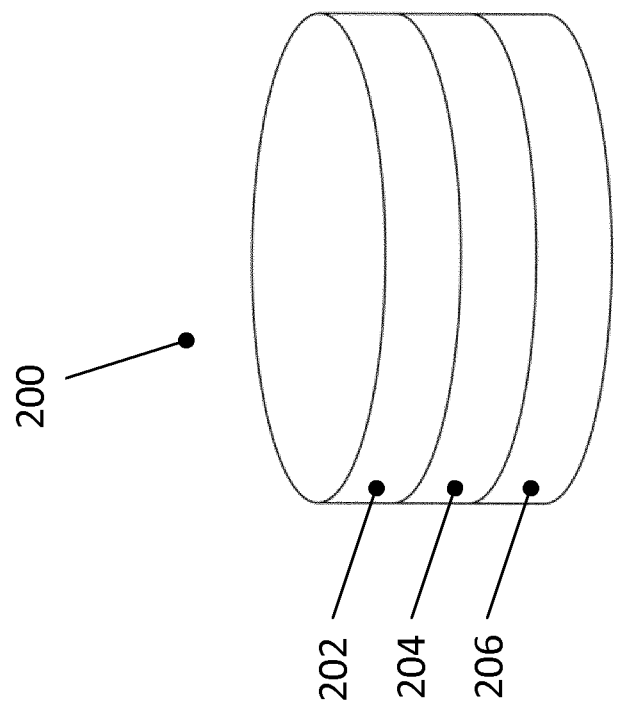
FIG. 8A shows a multilayer sample body manufactured in accordance with an embodiment.

FIG. 8A shows a multilayer sample body 200 manufactured in accordance with an embodiment. More specifically, the multilayer sample body comprises a first (upper) layer 202 of sample material, a second (middle) layer 204 of sample material, and a third (lower) layer 206 of sample material. The sample body 200 is generally produced in a sequence of steps. For example, each of the first, second, and third layers 202, 204, 206 may first be produced individually by corresponding molding processes using the same device. Then two of them, e.g. the upper layer 202 and the middle layer 204 or the middle layer 204 and the lower layer 206 may be combined into single double layer sample by arranging the two single layers 202 and 204 or 204 and 206 on top of each other in the same device and melting them together. As a final step, the last single layer sample body, i.e. 206 or 202 is added in a last molding operation. The skilled person will appreciate that many further variations of this principle are possible depending on the properties of the different sample materials.

FIG. 8B shows a coated sample body 300 manufactured in accordance with an embodiment. In this embodiment, a sample body core 302 is formed in a first molding operation. Then the sample body core 302 is moved to a larger molding apparatus or the size of the hollow bore 116 and the protrusion 132 of the same apparatus is increased, e.g. by exchanging modular parts, such as the inner cylindrical element 113 and/or the intermediate cylindrical element 111 in the embodiment described above in conjunction with FIG. 7. A coating material is also filled into the hollow bore of the apparatus and molded into a coating 304 surrounding the core 302 to produce the coated sample body 300 shown in FIG. 8B.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. An apparatus for molding a thermoplastic material into a homogenous sample body having a predetermined shape, the apparatus comprising:
   a main body comprising a first opening, a second opening and a hollow bore having a diameter smaller than the first opening and the second opening and connecting the first opening with the second opening;
   a separation foil positioned within the hollow bore and shaped to cover at least a portion of a surface of the hollow bore;
   a piston adapted to fit moveably into the hollow bore containing the separation foil;
   a base plate comprising a protrusion, wherein the base plate is adapted to be inserted into the first opening in such a manner that the protrusion extends into a part of the hollow bore containing the separation foil, and wherein the base plate is adapted to transfer heat to and from a thermoplastic material resting on the protrusion;
   a vacuum connector adapted to be connected to a vacuum source; and
   a lid having a diameter larger than a diameter of the piston and adapted to fit moveably into the second opening and to apply a force to the piston when the vacuum connector is connected to the vacuum source such that the piston applies a compressing force to the thermoplastic material resting on the protrusion.

2. The apparatus according to claim 1, wherein
   the protrusion is an integral part of the base plate, or
   the protrusion is a separate part adapted to be detachably arranged on the base plate.

3. The apparatus according to claim 1, wherein
   the base plate is adapted to transfer heat between an external heating and/or cooling unit and the thermoplastic material, and/or
   the base plate comprises an integrated heating and/or cooling unit.

4. The apparatus according to claim 1, wherein the cross sectional area of the first opening is larger than the cross sectional area of the second opening.

5. The apparatus according to claim 1, wherein the main body further comprises at least one hollow bypass channel extending between the first opening and the second opening.

6. The apparatus according to claim 1, wherein the vacuum connector is comprised by the lid, the main body or the base plate.

7. The apparatus according to claim 1, wherein the first opening and the second opening of the main body are formed as cylindrical cut-out portions at opposing sides of the main body.

8. The apparatus according to claim 1, further comprising:
   a first sealing for providing a gas tight connection between the base plate and the main body when the base plate is inserted into the first opening of the main body; and/or
   a second sealing for providing a gas tight connection between the lid and the main body when the lid is inserted into the second opening of the main body.

9. The apparatus according to claim 1, further comprising a temperature sensor arranged in the base plate or in the piston and adapted to provide an output signal indicative of the temperature in the vicinity of the thermoplastic material resting on the protrusion.

10. The apparatus according to claim 1, further comprising a spacer ring adapted to be arranged between main body and lid to control the compression force.

11. The apparatus according to claim 1, further comprising
   a first pressing unit adapted to act between lid and main body in order to reduce the pressing force and/or
   a second pressing unit adapted to act between lid and piston in order to increase the pressing force.

12. The apparatus according to claim 1, further comprising an internal heating/cooling unit arranged in the main body, in the piston or in the lid.

13. The apparatus according to claim 1, wherein the main body comprises a thermally conducting inner element and an outer element.

14. The apparatus according to claim 13, wherein the main body further comprises a thermally insulating intermediate element adapted to be arranged between the inner element and the outer element of the main body.

15. A system for molding a thermoplastic material into a homogenous sample body having a predetermined shape, the system comprising:
   an apparatus according to claim 1;
   wherein the separation foil for insertion into the hollow bore is tubular;
   a vacuum source adapted to be connected to the vacuum connector of the apparatus; and
   a heating unit adapted to apply heat to the base plate of the apparatus.

16. The system according to claim 15, further comprising a cooling unit for cooling the molded sample body of thermoplastic material.

17. The system according to claim 15, further comprising a pressing unit adapted to apply additional force to the lid and piston or to the lid and main body.

* * * * *